Figure 1:
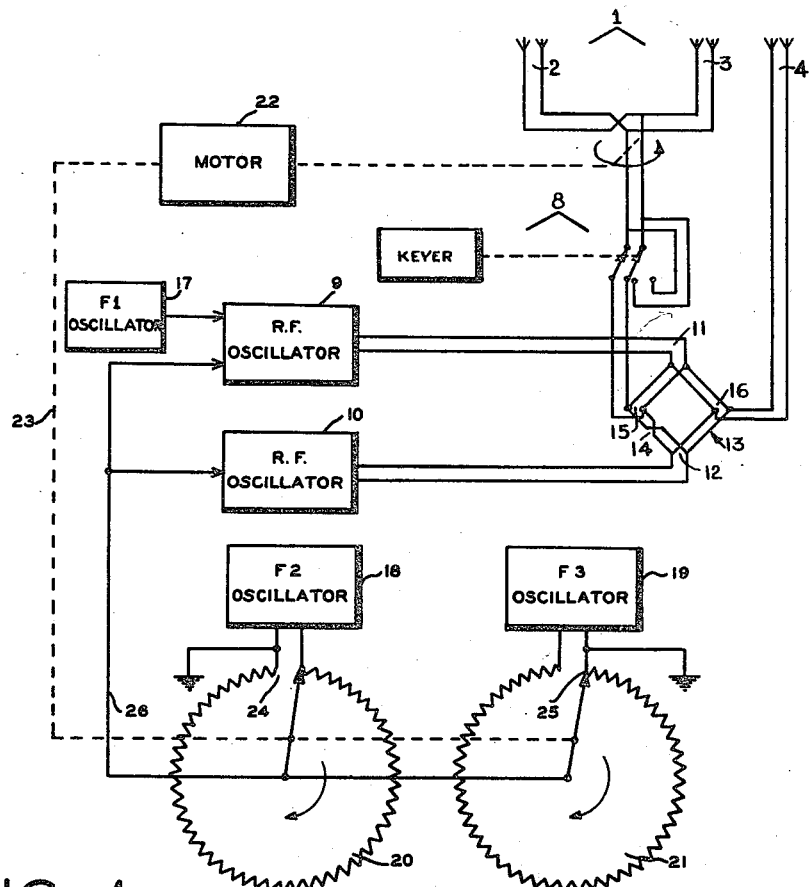

May 30, 1950 — L. HIMMEL — 2,509,230

BEACON SYSTEM

Filed Feb. 28, 1946

INVENTOR.
LEON HIMMEL
BY
*R. P. Morris*
ATTORNEY

Patented May 30, 1950

2,509,230

UNITED STATES PATENT OFFICE 2,509,230

BEACON SYSTEM

Leon Himmel, New York, N. Y., assignor to Federal Telephone and Radio Corporation, New York, N. Y., a corporation of Delaware Application February 28, 1946, Serial No. 650,965

4 Claims. (Cl. 343—109)

This invention relates to radio beacons, for example those adapted for aircraft guidance, and more particularly to radio beacons of the type in which a plurality of courses around a radio beacon location may be defined.

In order that aircraft or other forms of craft may follow any one of a plurality of courses to approach a beacon from any direction, a number of radio beacons generally termed "omni-directional radio beacons," have been developed. One form of omni-directional beacon is provided by rotating a directive pattern carrying a first signal around a fixed point and transmitting an omni-directional second signal from the beacon at the moment when the directive pattern passes through a single particular reference direction such as for example, the north. In this type of beacon, it is necessary that some sort of timing means be provided so that the elapsed time between receipt of the omni-directional signal and the maximum directive signal will indicate to the pilot which of the courses he is following.

It is an object of the present invention to provide an improved omni-directional beacon of the type utilizing a rotative directive pattern and an omni-directional pattern, in which timing of periods defined by a particular reference direction and receipt of the stronger signal, is not necessary.

In accordance with a feature of the present invention as the directive pattern is being rotated, a signal in an omni-directional pattern consisting of two frequencies whose total percent modulation of the carrier may be a constant, but whose relative percent modulation is a function of the angle of rotation of the directive pattern. These two frequencies may be audio-frequencies. Thus in the output of a suitable receiver with automatic volume control, the amplitudes of the two audio-frequencies may be compared as for example, by using a rectifier bridge and a meter, to thereby obtain an indication of the bearing of the observer.

The directive pattern may consist of two overlapping patterns which may be, for example, keyed, or have different modulation frequencies, to provide an interlocked course.

An other object of the present invention is, therefore, the provision of a beacon system in which the particular bearing is indicated by radiating, in an omni-directional pattern, two audio-frequencies whose relative percent modulation is a function of the angle of rotation of the directive pattern.

Another object of the present invention is the provision of a beacon of the type indicated in the foregoing paragraph, in which an interlocked course is employed so as to provide a sharp indication of bearing.

Figure 2:
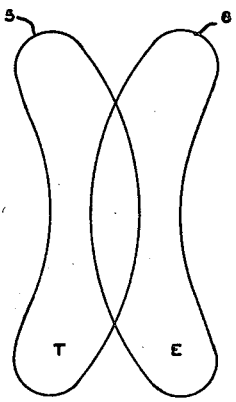

The foregoing together with other and further objects and features of the invention will become more apparent and the invention itself will be best understood from the following description of an embodiment thereof, reference being had to the drawings, in which:

Fig. 1 is a schematic diagram of an omnidirectional beacon embodying my invention; and Fig. 2 is a diagrammatic representation of the directive patterns produced in the system of Fig. 1.

Referring now to Fig. 1, the radio beacon there illustrated includes a rotatable antenna system, generally designated by the numeral 1, consisting of two side arrays 2 and 3 respectively between which is located a central antenna 4. (Antenna 4 is shown on one side of the array for the sake of clarity, but in actual practice is located between the side arrays.) To provide an interlocked course so that the antenna system will produce two directive patterns 5 and 6 (see Fig. 2), any suitable known arrangement may be used as for example, that described in Patent No. 2,293,694, granted to A. Alford on Aug. 25, 1943, according to which patent, directive patterns 5 and 6 are produced simultaneously with the patterns having different modulation frequencies, or, as illustrated in the present disclosure, patterns 5 and 6 may be produced alternately. For this purpose, the side arrays 2 and 3 are connected together with a trans-position 7, and to a T-E keyer 8, which may be a reversing switch which operates at a T-E rate to produce patterns 5 and 6 in T-E code time.

Carrier frequency energy for the antenna system 1 may be derived from two oscillators 9 and 10 of the same radio frequency which feed opposite points 11 and 12 of a conjugate bridge or network 13 of the type disclosed in U. S. Patent 2,147,807 to A. Alford having a transposition 14 in one leg thereof. (See above-mentioned patent for a fuller description of said bridge 13.) The other two opposite points 15 and 16 of the bridge 13 are connected respectively to the T-E keyer 8 and to the center antenna 4. To render the signal supplied to the antenna system audible, an audio-frequency oscillator 17 (of a frequency hereinafter designated as F1) is used to modulate one of the radio frequency oscillators as for example, oscillator 9. Because of the particular connections to the bridge 13, radio frequency oscillators 9 and 10 add to each other at point 16 of the loop so that the antenna 4 is fed with the carrier signal as well as the signal from the audio-frequency oscillator 17, while at point 15 the carrier frequencies cancel and only the side bands, due to the modulation caused by oscillator 17, are fed to the T-E keyer 8. Consequently there will be radiation from the antenna systems in accordance with patterns 5 and 6 of Fig. 2, in which, pattern 5 will be keyed according to the T timing of the T-E interlocked course and pattern 6 will be keyed according to the E, both patterns carrying the F1 audio-frequency signal.

In accordance with the present invention, antenna 4 is fed with two frequencies F2 and F3, preferably audio-frequencies, whose total percent modulation is a constant but whose relative percent modulation is a function of the angle of the rotation of the antenna system 1 and the directive patterns 5 and 6. For this purpose two audio-frequency oscillators 18 and 19 are provided which operate at frequencies F2 and F3 respectively. Audio frequency oscillators 18 and 19 simultaneously modulate the radio frequency oscillations of oscillators 9 and 10. While the total percent modulation of the radio frequency oscillators 9 and 10 is a constant, the relative percent modulation of these oscillators, due to audio-frequency oscillator 18 and as compared with audio-frequency oscillator 19, is a function of the angle of rotation of the antenna system 1 and, it is preferred that as the amount of modulation due to oscillator 18 increases, the relative amount of modulation due to the oscillator 19 decreases, and vice versa, or stated another way the amount of modulation produced by oscillator 18 varies inversely with the amount of modulation produced by oscillator 19.

For this purpose, audio-frequency oscillators 18 and 19 may be connected to the resistors of rotatable potentiometers 20 and 21 respectively. The rotatable arms of the potentiometers may be controlled by the same motor 22 which is used to rotate the antenna system 1, as indicated by broken line 23. In the embodiment illustrated, the inverse variation of output derived from modulators 18 and 19, and applied to modulate radio frequency oscillators 9 and 10 simultaneously, is produced by having the potentiometer arms rotate in the same direction but reversely connecting the audio-frequency oscillators 18 and 19 to the resistors of their associated potentiometers 20 and 21 respectively. For this purpose the left termination 24 of the resistor of potentiometer 20 is connected to ground, whereas the right termination 25 of the resistor of potentiometer 21 is connected to ground. Thus as the arms of potentiometers 20 and 21 rotate synchronously clockwise from the position indicated, at the output of the potentiometers the amplitude of the F2 oscillations decrease, while the amplitude of the F3 oscillations increase. This inverse variation of the frequencies F2 and F3 continues as the potentiometer arms rotate through 360°.

The potentiometer arms are connected together and over line 26 to modulate the oscillators 9 and 10. None of the signals carrying the F2, F3 modulation, will reach the side antennas 2 and 3 since the signal carrying the F2, F3 modulation when fed to points 11 and 12, will cancel at point 15 and will add at point 16, so that the F2, F3 modulation signal will be fed to central antenna 4 and radiated in an omni-directional pattern.

While I have described various details in connection with only one embodiment of the present invention, it will be apparent to those versed in the art that considerable variation therefrom is possible and that numerous changes may be made in these details without departing from the teachings thereof. For example, instead of a T-E keyer, other forms of keying may be employed such as A-N keying, etc. Furthermore, as described in the hereinabove mentioned patent to Alford, the two patterns 5 and 6 may be simultaneously produced. In place of the directive patterns of the type illustrated in Fig. 2, other forms of directive patterns such as uni-directional lobes may be employed. Various other ways of changing the relative amplitude of the modulations, due to F2 and F3, may be employed instead of rotatable potentiometers. Numerous other changes will also occur to those versed in the art.

Accordingly, while I have described above the principles of my invention in connection with specific apparatus, it is to be clearly understood that this description is made only by way of example and not as a limitation on the scope of my invention.

I claim:

1. A radio beacon comprising means for radiating signals in the form of a pair of overlapping directive patterns, means for differently directing said directive patterns, means for radiating in a substantially uniformly-distributed pattern signals containing two audio-frequency components, and means for varying the relative amplitude of said two audio-frequency components according to the different directions of said directive patterns.

2. A radio beacon according to claim 1 wherein said overlapping directive patterns are alternately produced by keying means controlling the means for radiating said directive patterns.

3. A radio beacon comprising means for radiating signals in a directive pattern, means for differently directing said directive pattern, means for radiating in a substantially uniformly-distributed pattern signals containing two audio-frequency components whose relative amplitudes vary according to the different directions of said directive patterns, including an omni-directional antenna, a carrier frequency oscillator coupled to said antenna, a pair of audio-frequency oscillators, variable means for deriving from said audio-frequency oscillators signals of different amplitudes, means for applying the output from said variable means to modulate said carrier frequency oscillator, and means controlling said variable means and synchronized with said differently directing means for varying the relative amplitudes of said audio-frequency components according to the different directions of said directive patterns.

4. A radio beacon comprising antenna system for radiating signals in a directive pattern, means for rotating said antenna system to rotate said directive pattern, means for emitting signals in an omni-directional pattern including a radio frequency oscillator, and means for modulating the output of said radio frequency oscillator with two audio-frequency components comprising two audio-frequency oscillators operating at different audio-frequencies, variable means for deriving audio-frequency energy from said oscillators of variable amplitudes, means controlling said variable means and synchronized with the rotation of said antenna system for varying the relative amplitudes of said audio-frequency components according to the different directions of said directive patterns, and means for modulating with the output of said variable means the radio frequency output of said radio frequency oscillators.

LEON HIMMEL.

REFERENCES CITED

The following references are of record in the file of this patent:

UNITED STATES PATENTS

| Number | Name | Date |
|---|---|---|
| 1,379,541 | Erskine-Murray | May 24, 1921 |
| 2,194,548 | Hammond | Mar. 26, 1940 |
| 2,206,644 | Rocard | July 2, 1940 |
| 2,253,958 | Luck | Aug. 26, 1941 |
| 2,311,837 | Kandoian | Feb. 23, 1943 |
| 2,402,410 | Kear | June 18, 1946 |
| 2,412,986 | Himmel | Dec. 24, 1946 |
| 2,420,605 | McConnel | May 13, 1947 |
| 2,444,431 | Dubin | July 6, 1948 |
| 2,444,439 | Greig et al. | July 6, 1948 |